(12) United States Patent  (10) Patent No.: US 10,220,597 B2
Velez  (45) Date of Patent: Mar. 5, 2019

(54) BONDED VENEER WITH SIMULATED WOOD GRAIN AND TEXTURE, BONDED VENEER PANELS AND METHOD OF MAKING THE SAME

(71) Applicant: LF Centennial Limited, Tortola (VG)

(72) Inventor: Gustavo Velez, San Leandro, CA (US)

(73) Assignee: Living Style (B.V.I.) Limited, Road Town Tortola (VG)

( * ) Notice: Subject to any disclaimer, the term of this patent is extended or adjusted under 35 U.S.C. 154(b) by 352 days.

(21) Appl. No.: 15/092,668

(22) Filed: Apr. 7, 2016

(65) Prior Publication Data

US 2017/0246843 A1  Aug. 31, 2017

Related U.S. Application Data

(60) Provisional application No. 62/300,205, filed on Feb. 26, 2016.

(51) Int. Cl.
*B32B 3/10* (2006.01)
*B32B 21/14* (2006.01)
(Continued)

(52) U.S. Cl.
CPC ............ *B32B 21/14* (2013.01); *B32B 3/30* (2013.01); *B32B 21/06* (2013.01); *B32B 37/12* (2013.01);
(Continued)

(58) Field of Classification Search
None
See application file for complete search history.

(56) References Cited

U.S. PATENT DOCUMENTS

2004/0086678 A1* 5/2004 Chen ............... B05D 5/061
428/44
2010/0015420 A1* 1/2010 Riebel ............. B32B 27/06
428/203
(Continued)

FOREIGN PATENT DOCUMENTS

CA 2785734 A1 7/2011
GB 308739 5/1930
(Continued)

OTHER PUBLICATIONS

Japanese Office Action, dated Oct. 31, 2017 for Japanese Patent Application No. 2016-120460.

*Primary Examiner* — Christopher M Polley
(74) *Attorney, Agent, or Firm* — Barlow, Josephs & Holmes, Ltd.

(57) ABSTRACT

A simulated wood veneer product is disclosed. The simulated wood veneer product includes a paper substrate and an imprintable wood fiber material applied to one side of the paper substrate. The imprintable wood fiber material provides the paper substrate with depth and allows the paper to receive and retain an imprinted wood grain texture. Once imprinted, the veneer product is printed with a simulated wood grain pattern to create a realistic simulated veneer product which is referred to herein as a "bonded veneer". The bonded veneer product can then be adhered to a structural or composite wood panel, such as an MDF panel, to create a simulated wood veneer panel which can be used in the construction of furniture products.

12 Claims, 5 Drawing Sheets

(51) Int. Cl.
  *B32B 3/30*      (2006.01)
  *B32B 21/06*     (2006.01)
  *B32B 37/12*     (2006.01)
  *B32B 38/00*     (2006.01)
  *B44F 9/02*      (2006.01)
  *B44C 5/04*      (2006.01)

(52) U.S. Cl.
  CPC ........ *B32B 38/0012* (2013.01); *B32B 38/145* (2013.01); *B32B 38/164* (2013.01); *B44C 5/04* (2013.01); *B44F 9/02* (2013.01); *B32B 2255/12* (2013.01); *B32B 2255/26* (2013.01); *B32B 2262/067* (2013.01); *B32B 2317/12* (2013.01); *B32B 2317/16* (2013.01); *B32B 2479/00* (2013.01)

(56) References Cited

U.S. PATENT DOCUMENTS

| | | |
|---|---|---|
| 2010/0307675 A1 | 12/2010 | Buhlmann |
| 2012/0015176 A1 | 1/2012 | Riebel |

FOREIGN PATENT DOCUMENTS

| | | |
|---|---|---|
| GB | 831811 | 3/1960 |
| GB | 1181927 | 2/1970 |
| GB | 1438476 | 6/1976 |
| JP | 55-002042 | 6/1978 |
| JP | 2001-293703 | 10/2001 |
| JP | 2002-019066 | 1/2002 |
| JP | 2011-173285 | 9/2011 |
| KR | 10-1999-0073828 | 10/1999 |
| KR | 10-2009-0048951 | 5/2009 |

\* cited by examiner

BONDED VENEER WITH SIMULATED WOOD GRAIN AND TEXTURE, BONDED VENEER PANELS AND METHOD OF MAKING THE SAME

BACKGROUND OF THE INVENTION

1. Field of the Invention

The present disclosure relates generally to structural wood products and wood veneers that are applied to structural wood products for use in furniture, and more particularly to a simulated veneer product made from a paper substrate and an imprintable material adhered to the paper substrate.

2. Background of the Related Art

Wood veneers are desirable because they give the appearance of solid wood, with all of its grain and texture, to products made of composite wood materials. Wood veneers provide stability and strength as well as improved aesthetic appearance when they are applied over structural or composite wood products. The use of wood veneers is also desirable for forest sustainability and lower material costs.

Simulated wood veneer products have also had success in lower cost furniture products. In this regard, paper veneers with printed wood grain patterns have seen some success in the market. However, these simulated paper veneer products lack the depth and texture of real wood veneers.

SUMMARY OF THE INVENTION

Accordingly, the development of improved simulated veneer products that enhance the stability and strength of structural wood panels, allow for deeper three-dimensional grain patterns over standard paper veneers, reduce costs and provide sustainability of forests would be highly desirable.

The veneer product described herein solves the problems of the prior art by providing a simulated veneer product comprising a paper substrate and an imprintable material applied to one side of the paper substrate. The imprintable material provides the paper substrate with depth and allows the paper substrate to receive and retain an imprinted wood grain texture. Once imprinted, the veneer product is then printed with a simulated wood grain pattern to create a very realistic simulated wood veneer product which is referred to herein as a "bonded veneer". The bonded veneer product can then be adhered to a structural or composite wood panel, such as a Medium Density Fiberboard (MDF) panel, to create a veneer panel which can be used in the construction of furniture products.

In one embodiment, the wood grain texture is imprinted into the paper substrate side of the bonded veneer and also printed on the paper substrate side. The imprintable material side is glued to the wood panel.

In another embodiment, the wood grain texture is imprinted into the imprintable material side and is also printed on the imprintable material side. In this embodiment, the paper substrate side is glued to the wood panel.

BRIEF DESCRIPTION OF THE DRAWINGS

These and other features, aspects, and advantages of the present invention will become better understood with reference to the following description, appended claims, and accompanying drawings where:

DESCRIPTION OF THE PREFERRED EMBODIMENT

Figure 1:
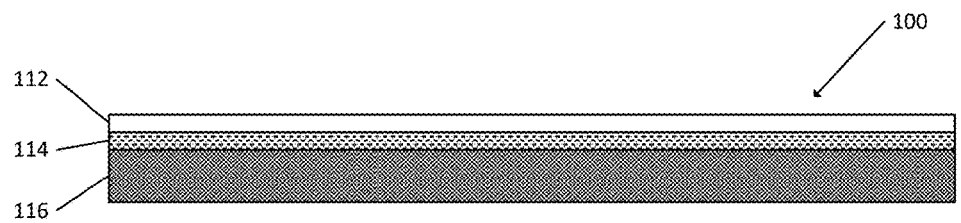
FIG. 1 is an illustration of a first exemplary embodiment the bonded veneer product.

Referring to FIG. 1, a first exemplary embodiment of the bonded veneer is illustrated and generally indicated at 100. The bonded veneer product 100 includes a substrate 112, which is preferably a paper material, but may also comprise other suitable substrate materials, including but not limited to polymer or polymer film materials. The substrate 112 is coated with an adhesive material 114 and an imprintable material 116.

The paper substrate 112 is preferably a conventional wood pulp paper material supplied in wide format roll form. The weight and brightness of the paper can vary depending on the particular end use application however, the paper is preferably between 0.3 mm and 0.4 mm thick.

Suitable materials for the adhesive material 114 may include urea-formaldehyde resins (UF), phenol formaldehyde resins (PF), melamine-formaldehyde resins (MF), methylene diphenyl diisocyanate (MDI) or polyurethane (PU) resins. Other adhesives may be used as suitable for the intended purpose.

The imprintable material 116 can be selected from a variety of wood fiber materials including all variations of soft and hard woods. Preferably the imprintable material is a sawdust material similar to the wood fiber material used in making Medium Density Fiberboard (MDF). The imprintable material 116 can also be selected from other sustainable materials such as bamboo fiber, soybeans, cornstarch, or other eco-friendly materials. When adhered to the paper substrate 112, the wood fiber material 116 provides the paper substrate 112 with an increased thickness and texture simulating real wood veneer. The wood fiber material 116 is preferably applied in a thickness that is approximately 0.5 mm to about 0.7 mm thick. The wood fiber material 116 may be applied separately or may be premixed into the adhesive 114 prior to application to the substrate 116 (now shown).

Figure 2:
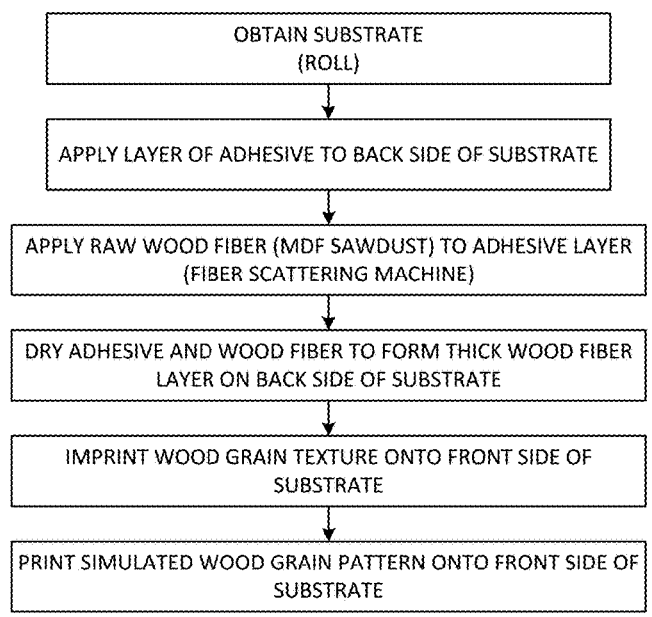
FIG. 2 is a flowchart of a method of making the bonded veneer product of FIG. 1.

Referring to FIG. 2, an exemplary method of making the bonded veneer 100 is described. The paper substrate 112 is preferably supplied in roll form for a continuous production process. The paper substrate 112 is fed through an adhesive coater device, such as a hot melt coater, to apply a layer of adhesive 114 and then through a fiber scattering machine which evenly distributes a layer of raw wood fiber material 116 (sawdust) onto the still wet adhesive 114. The coating thicknesses of the adhesive 114 and the imprintable sawdust material 116 can be varied as desired for the intended end-use application.

Thereafter, the coated substrate 112 is preferably passed through a long drying oven to dry the adhesive 114 and set the fiber material 116 into a completed bonded veneer product 100. The bonded veneer 100 is then re-rolled onto a take-up roll for further processing.

Although not shown in the flow charts, a second application of adhesive and imprintable wood fiber material can be completed if a thicker veneer material is desired.

Figure 9:
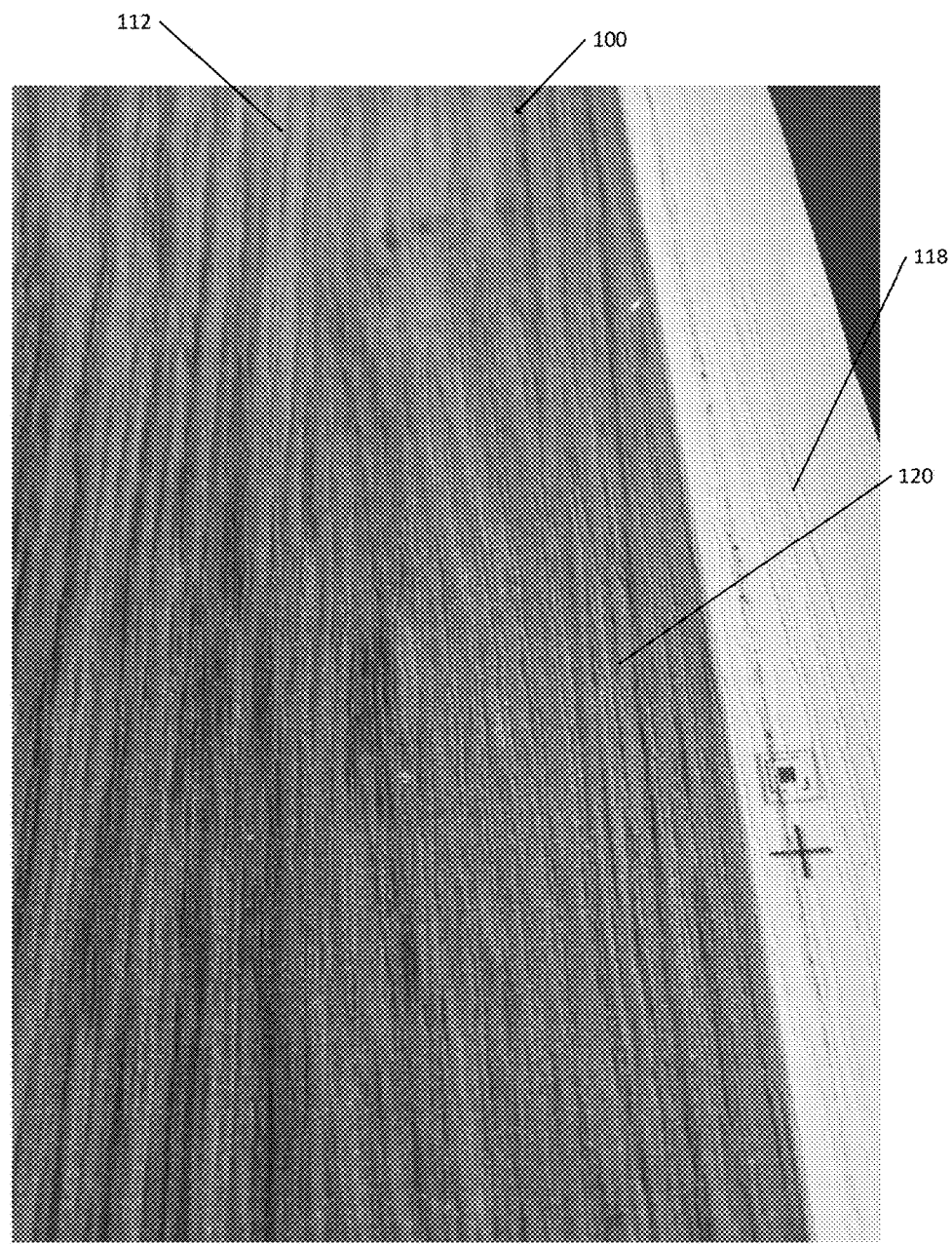
FIG. 9 is an illustration of the bonded veneer material showing the imprinted surface texture and simulated wood grain printing.

The bonded veneer product 100 is then imprinted (on the paper substrate side) with a wood grain texture 118 (See FIG. 9) to simulate the look and feel of real wood. The imprinting is completed in a nip roll imprinting device with one smooth roller and a second roller having a raised wood grain texture. When the bonded veneer passes through the nip, the wood grain texture 118 is imprinted into the bonded veneer product 100. The adhesive 114 and fibrous sawdust material 116 provide the paper substrate 112 with a thickness and pliability that is capable of receiving and retaining the realistic wood grain texture 118 from the imprinting rollers.

After imprinting, the bonded veneer can be rolled again onto a take up roll for later printing or fed directly into a multi-stage printing assembly to complete the process. The multi-stage printing assembly successively lays down colors to create a simulated wood grain pattern 120 on the imprinted substrate 112. For example, the bonded veneer 100 may be printed using a six color printing machine. The first cylinder of the printing machine will apply a base coat to the substrate. The second through sixth cylinders of the printing machine will apply different colors to the substrate, the combination of which provides the printed appearance of a finished or natural wood product. The colors may be changed to vary the tone and final appearance of the print. When completed, the imprinted and printed veneer product 100 mimics real wood veneer in both texture and appearance.

Figure 3:
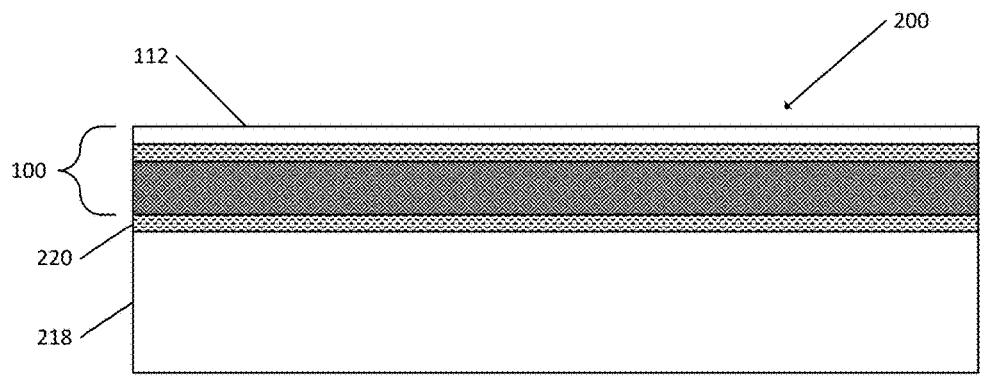
FIG. 3 is an illustration of a structural wood panel having the bonded veneer product of FIG. 1 applied to one side thereof.
Figure 4:
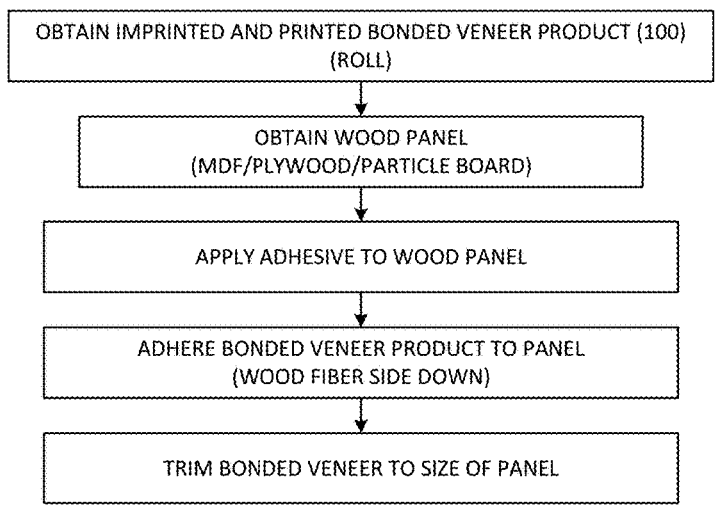
FIG. 4 is a flowchart of a method of making the bonded veneer panel of FIG. 3.

Referring now to FIGS. 3 and 4, the bonded veneer 100 may be applied to a structural wood panel 218 with an adhesive 220 to form a bonded veneer panel 200. The bonded veneer 100 is applied to the panel 218 with the paper substrate side 112 facing up (simulated wood grain facing away from the panel 218). The bonded veneer 100 may be applied to one or more surfaces of the panel 218, including the edges. Excess bonded veneer 100 is trimmed away from the panel 218 to create a finished bonded veneer panel 200 which may then be used to make furniture, shelving and other products that have previously been constructed with real wood veneer panels.

Suitable materials for the structural wood panel 218 may be any flat planar structural or composite wood material, but more particularly comprise engineered wood materials, such as plywood, hardboard, medium-density fiberboard ("MDF"), particleboard and the like.

Figure 5:
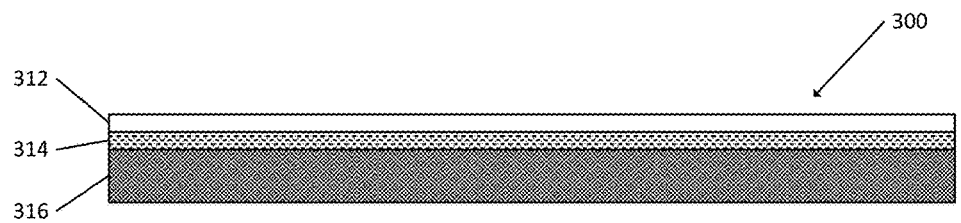
FIG. 5 is an illustration of a second exemplary embodiment of the bonded veneer product.
Figure 6:
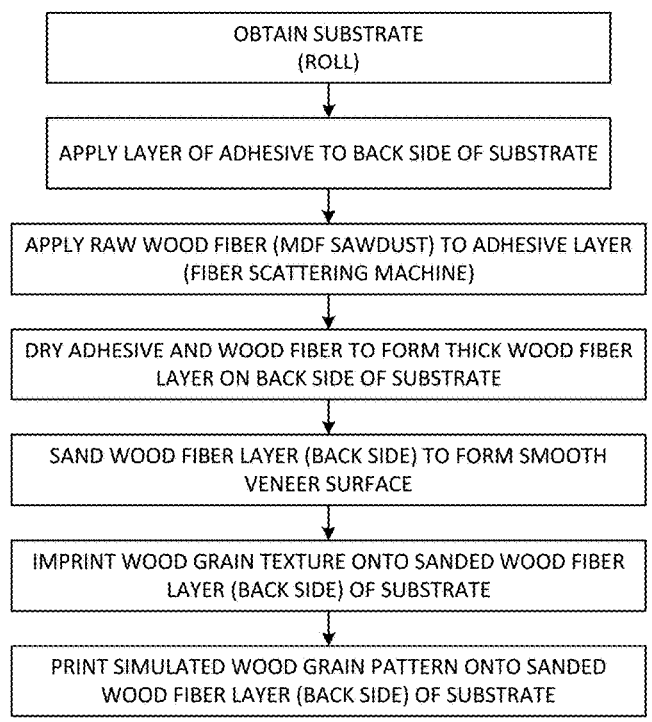
FIG. 6 is a flowchart of a method of making the bonded veneer product of FIG. 5.

Referring to FIGS. 5 and 6, a second exemplary embodiment of the bonded veneer product is illustrated and generally indicated at 300. The bonded veneer product 300 includes the same layers as the first embodiment 100. In particular, the bonded veneer product 300 includes a substrate 312 that is coated with an adhesive 314 and an imprintable material 316 is applied to the adhesive 314. The imprintable material 316 may be applied separately or premixed into the adhesive 314 prior to application to the substrate 316.

In contrast, in this embodiment, the simulated wood grain pattern is embossed and printed onto the exposed back surface of the imprintable material 316. In this regard, the imprintable material 316 provides an exterior surface texture and appearance that appearance mimics real wood veneers.

Like the first embodiment 100 suitable materials for the adhesive 314 in the second embodiment 300 also include urea-formaldehyde resins (UF), phenol formaldehyde resins (PF), melamine-formaldehyde resins (MF), methylene diphenyl diisocyanate (MDI) or polyurethane (PU) resins. Other adhesives may be used.

Referring to FIG. 6, the process steps for forming the bonded veneer 300 are generally the same as shown in FIG. 2 with the following exceptions. After the bonded veneer 300 exits the drying ovens and is re-rolled, the rear surface (outer surface) of the imprintable material 316 must be sanded to provide a smooth veener surface capable of accepting the imprinted grain texture and further accepting the printed wood grain pattern. Accordingly, the rolled material is passed through a sanding machine to provide the rear surface with a suitable finish for further processing. Thereafter, the same imprinting and printing steps are completed, the only difference being that the material 316 receives the imprinted texture and printed patterns.

Figure 7:
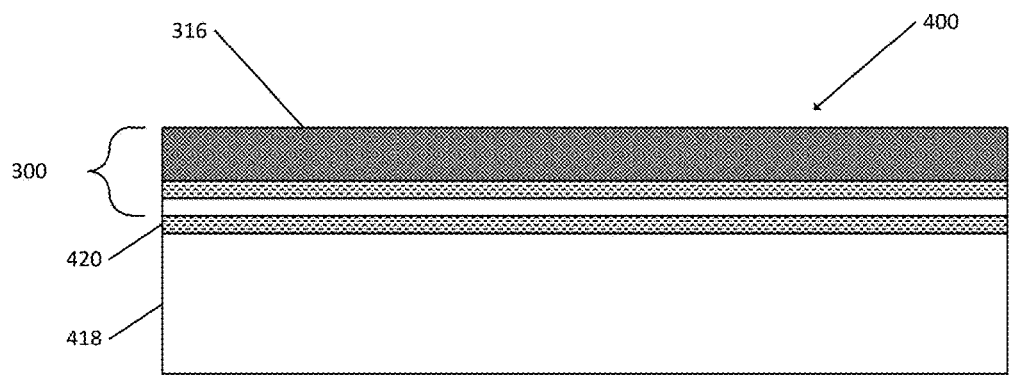
FIG. 7 is an illustration of a structural wood panel having the bonded veneer product of FIG. 5 applied to one side thereof.
Figure 8:
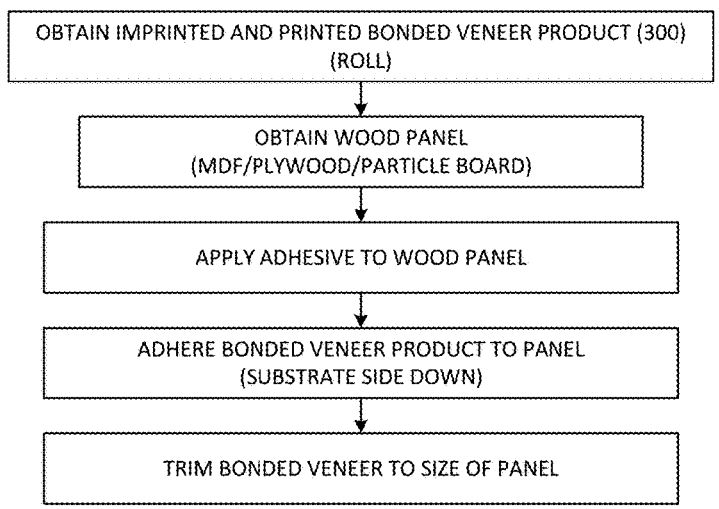
FIG. 8 is a flowchart of a method of making the bonded veneer panel of FIG. 7.

Referring to FIGS. 7 and 8, the bonded veneer product 300 may be applied to a structural or composite wood panel 418 with an adhesive 420. The bonded veneer 300 is applied to the panel 418 with the paper substrate side 316 facing the panel 418 (material 316 and simulated wood grain texture outwardly facing away from the panel 418). The bonded veneer 300 may be applied to one or more surfaces of the panel 418, including the edges. Excess bonded veneer 300 is trimmed away from the panel 418 to create a finished bonded veneer panel 400 which may then be used to make furniture, shelving and other products that have previously been constructed with real wood veneer panels.

Like the first embodiment 200, suitable materials for the structural wood panel 418 in the second embodiment 400 also comprise engineered wood materials, such as plywood, hardboard, medium-density fibreboard ("MDF"), particleboard and the like.

Additional coatings may be applied to the imprintable material 116 side or paper substrate 112 side in order to improve one or more properties such as durability, mold inhibition, fire retardance, UV protection, or to improve the finished appearance, such as gloss or matte finish coatings.

It can therefore be seen that the present invention provides a novel bonded veneer product that is eco-friendly, stable and strong, low material cost and minimizes the use of natural wood. The bonded veneer product has the further advantage of reducing costs in manufacturing.

It would be appreciated by those skilled in the art that various changes and modifications can be made to the illustrated embodiments without departing from the spirit of the present invention. All such modifications and changes are intended to be within the scope of the present invention except as limited by the scope of the appended claims.

What is claimed is:

1. A simulated wood veneer product, comprising:
   a wood pulp paper substrate having a first side and a second side;
   a layer of imprintable material overlying the second side of the paper substrate, said layer of imprintable material comprising a resin-based adhesive and a scattered wood fiber material;
   a wood grain texture imprinted into said first side of said paper substrate; and
   a simulated wood grain pattern printed onto said first side of said paper substrate;
   wherein said imprintable material is adherable to a wood panel, and wherein the adhesive comprises one of urea-formaldehyde, phenol formaldehyde, melamine-formaldehyde, methylene diphenyl diisocyanate, or polyurethane.

2. The simulated wood veneer product of claim 1, wherein the paper substrate has a thickness of about 0.3 mm to about 0.4 mm.

3. The simulated wood veneer product of claim 1, wherein the adhesive comprises polyurethane.

4. The simulated wood veneer product of claim 2, wherein the adhesive comprises polyurethane.

5. The simulated wood veneer product of claim 1, wherein said imprintable material comprises MDF sawdust.

6. The simulated wood veneer product of claim 1, wherein the imprintable material is between about 0.5 mm to about 0.7 mm thick.

7. A simulated wood veneer panel, comprising:
a wood panel; and
a simulated wood veneer product bonded to a surface of the wood panel;
the simulated wood veneer product comprising,
  a wood pulp paper substrate having a first side and a second side;
  a layer of imprintable material overlying the second side of the paper substrate, said layer of imprintable material comprising a resin-based adhesive and a scattered wood fiber material;
  a wood grain texture imprinted into said first side of said paper substrate; and
a simulated wood grain pattern printed onto said first side of said paper substrate,
wherein the adhesive comprises one of urea-formaldehyde, phenol formaldehyde, melamine-formaldehyde, methylene diphenyl diisocyanate, or polyurethane.

8. The simulated wood veneer panel of claim 7, wherein the adhesive comprises polyurethane.

9. The simulated wood veneer panel of claim 7, wherein said wood panel comprises MDF, and wherein said wood fiber material comprises MDF sawdust.

10. A method of making a simulated wood veneer product comprising the steps of:
obtaining a wood pulp paper substrate:
applying an imprintable material onto the second side of the paper substrate, said layer of imprintable material comprising a resin-based adhesive and a scattered wood fiber material;
drying the imprintable material to form an imprintable material layer on said back side of said substrate;
imprinting a wood grain texture onto a front side of said paper substrate; and
printing a simulated wood grain pattern onto said imprinted front side of said paper substrate.

11. The method of claim 10, wherein said step of applying an imprintable material onto the second side of the paper substrate, comprises:
applying an adhesive onto a back side of said paper substrate.

12. The method of claim 11, wherein said step of applying an imprintable material onto the second side of the paper substrate, comprises:
scattering the wood fiber material onto the adhesive.

* * * * *